Figure 1:
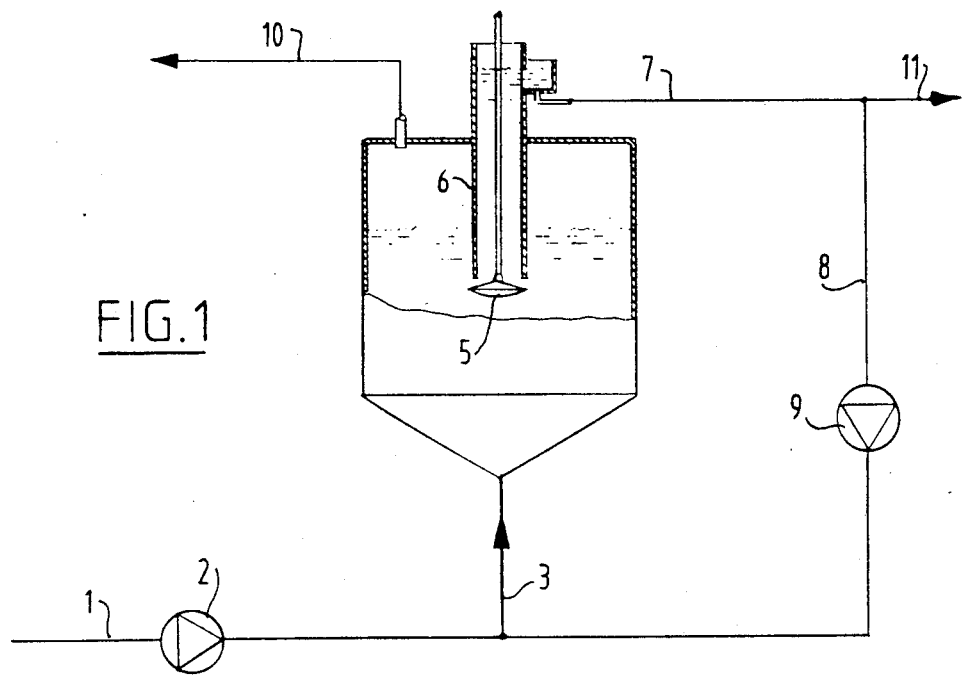

United States Patent [19]

Bleeker

[11] Patent Number: 5,071,559
[45] Date of Patent: Dec. 10, 1991

[54] TREATMENT OF MANURE CONDENSATE

[75] Inventor: Erik D. J. Bleeker, Epe, Netherlands

[73] Assignee: MeMon B.V., Netherlands

[21] Appl. No.: 511,728

[22] Filed: Apr. 20, 1990

[30] Foreign Application Priority Data

Mar. 16, 1990 [NL] Netherlands .......................... 9000615

[51] Int. Cl.$^5$ ............................................... C02F 3/30
[52] U.S. Cl. ..................................... 210/605; 210/607; 210/609; 210/610; 210/622; 210/624; 210/631; 210/903; 210/906
[58] Field of Search ............... 210/603, 605, 607, 609, 210/610, 611, 614, 622–626, 629–631, 903, 906

[56] References Cited

U.S. PATENT DOCUMENTS

| | | | |
|---|---|---|---|
| 3,855,079 | 12/1974 | Greenfield et al. | 203/47 |
| 4,172,034 | 10/1979 | Carlsson et al. | 210/620 |
| 4,270,974 | 6/1981 | Greenfield et al. | 159/16 S |
| 4,393,166 | 7/1983 | Reischl et al. | 210/631 |
| 4,608,120 | 8/1986 | Greenfield et al. | 159/17.1 |
| 4,668,388 | 5/1987 | Dibble et al. | 210/604 |
| 4,882,058 | 11/1989 | Burton | 210/622 |

OTHER PUBLICATIONS

Natuur en Techniek, vol. 57, No. 11, W. Rulkens et al. "Mest Uit Mest", pp. 895–903.

Patent Abstracts of Japan, vol. 12, No. 96, Mar. 29, 1988, JP, A, 62227498, Oct. 6, 1987.
Patent Abstracts of Japan, vol. 7, No. 273, Dec. 6, 1983, JP, A, 58153594, Sep. 12, 1983.
Patent Abstracts of Japan, vol. 12, No. 405, Oct. 26, 1988, JP, A, 63144000, Jun. 16, 1988.
Patent Abstracts of Japan, vol. 10, No. 107, Apr. 22, 1986, JP, A, 60235698, Nov. 22, 1985.

Primary Examiner—Tom Wyse
Attorney, Agent, or Firm—Webb, Burden, Ziesenheim & Webb

[57] ABSTRACT

The invention relates to a method for processing manure, comprising the steps of:
i) adding an organic carrier liquid to the manure;
ii) concentrating the mixture of manure and carrier liquid;
iii) condensing the formed vapor;
vi) anaerobic treating of the condensate; and
v) aerobic treating of the effluent from the anaerobic treatment.

Preferably the effluent deriving from the anaerobic treatment is denitrified in a denitrification unit and nitrified in a nitrification unit, and wherein a portion of the sludge-influent mixture from the nitrification unit is recirculated to the denitrification unit.

The treating yield is greater than 90%, preferably greater than 95%, such as 97–99% BOD.

31 Claims, 1 Drawing Sheet

TREATMENT OF MANURE CONDENSATE

The present invention relates to the treating of manure condensate that results in the processing of manure.

For the cost-effectiveness of processing processes for manure it is important to separate as many valuable products as possible from the manure. Not only the sale price of these valuable products is of importance but also the price that has to be paid for treating the resulting waste flows which can only be discharged into the environment after treatment.

A process for processing manure is only cost-effective from an economic point of view if the forming of valuable products is maximalized while at the same time the forming of waste flows is minimized. For the waste flows this means that the composition of the waste flows must be such that they can be treated at the lowest possible cost. These treating costs can be further reduced if during treatment products result which can contribute to the cost-effectiveness of the total processing process for manure. In this case the production of biogas is given particular attention.

A first, known processing process for manure is the so-called Promest process, wherein the manure is fermented in a fermentation installation prior to further processing and biogas is formed. Subsequently separated from the fermented manure are the solids which, after drying, provide a manure cake. As a consequence of the fermentation the waste flows contain a small quantity of organic compounds, but the quantity of inorganic compounds is relatively high, whereby the treating costs of the formed waste water flows are comparatively high. Moreover, the total manure volume is in principle subjected to a fermentation which is therefore voluminous on account of the long duration time in the fermentation installation.

A second known processing process is the so-called Greenfield process (U.S. Pat. No. 3,855,079, U.S. Pat. No. 4,270,974 and U.S. Pat. No. 4,608,120). According to this known processing process an organic carrier liquid is added to the manure, whereafter the mixture of manure and carrier liquid is dehydrated by evaporation, whereafter the formed vapour is condensed to condensate. The composition of this condensate is such that this condensate can only be discharged into the environment after treatment.

A biological treatment of this condensate seems virtually impossible because of the composition thereof.

Firstly, this condensate contains very few nutrients and minerals, which are necessary for a biological degradation.

Secondly, the condensate will contain toxic components derived from the manure, such as ammonia and phenolic compounds; and Thirdly, the condensate contains residues of the used organic carrier liquid which will have a braking effect on the bacterial degradation processes, or result in flushing of the biomass out of the treatment reactor.

Surprisingly, however, it has been found that the condensate, despite its composition, which would make a bacterial treatment expensive, can be treated at relatively low treating cost, if the condensate is subjected successively to an anaerobic treatment followed by an aerobic treatment.

The invention therefore relates to a method for processing manure, which method comprises the steps of:

i) adding an organic carrier liquid to the manure;
ii) concentrating the mixture of manure and carrier liquid;
iii) condensing the formed vapour;
iv) anaerobic treating of the condensate; and
v) aerobic treating of the effluent from the aerobic treatment.

If the manure is acidified, preferably prior to concentrating thereof, but more preferably immediately after the production of the manure, that is, on the farm, the amount of ammonia in the manure remains high, thus avoiding ammonia emission. Because of the low pH, undesired fermentation will moreover occur as little as possible, whereby the organic material present is not degraded, and this organic material, which passes over into the condensate via the vapour phase, can function therein as an essential carbon source. The supplement of a carbon source can thereby be dispensed with to a very considerable extent.

If in preference a portion of the effluent from the anaerobic treatment is recirculated and mixed with condensate for treating, at the beginning of the anaerobic treating the adding of a base in order to raise the pH of the condensate to a pH necessary for anaerobic treatment can be omitted. The effluent of the anaerobic treatment in any case has a higher pH through the degradation of the fatty acids present in the condensate. In preference 20-90%, preferably 30-80%, and more preferably 40-80% of the effluent is recirculated.

In order to enable forming to a sufficient degree in the anaerobic treatment of new biomass, it is recommended that a nutrient preparation is added to the condensate such as molasses and vinasse.

It has been found that the condensate composition is such that there is a primary requirement for nitrogen. In the case of a nitrogen requirement the nutrient preparation therefore supplements such that the nitrogen requirement is provided, and this at least for a nitrogen requirement of at least 50 $g/m^3$, preferably 60 $g/m^3$, and more preferably 70–80 $g/m^3$.

Another nutrient requirement is the need for phosphor. If a phosphor requirement occurs a nutrient preparation supplements therefor, for instance for a phosphor requirement of at least 10 $g/m^3$, preferably 15 $g/m^3$, and more preferably 20 $g/m^3$.

If as a consequence of its composition the condensate requires a trace element supplement, this nutrient preparation preferably also contains trace elements. In diminishing requirement of trace elements the nutrient preparation may contain iron, nickel, cobalt, manganese, zinc, molybdenum and copper.

If necessary, micro-nutrients such as sulphur, potassium, calcium and magnesium may also be added.

It has been found that with an anaerobic treatment at a temperature of 30°–40° C., preferably 35°–40° C., and a pH 6–8, preferably 7, a COD (Chemical Oxygen Demand) processing yield can be achieved of more than 80%, preferably 85%, more preferably 90%, such as 90–95%.

Since the condensate contains substantially no sugars, amino acids and alcohols, but mainly volatile fatty acids, hydrogen and carbon dioxide, of particular importance for the anaerobic degradation are obligatory hydrogen producing acetogenic bacteria, acetic acid splitting, methane producing bacteria and hydrogen oxidizing, methane producing bacteria. This specific composition requires a specific biomass. It has been found that sludge used in the treatment of waste water from alcohol preparation and/or paper preparation is suitable as oculant sludge. This sludge is preferably adapted to the specific presence of relatively large quantities of propionic acid and isovaleric acid. Preferably used therefore is sludge that is adapted to the degradation of $C_n$ fatty acids, wherein $n \geq 2$. Found to be particularly suitable is sludge derived from the treating of waste water that is released during the production of sugar from sugar beets.

Since the anaerobic treatment leaves ammonia present in the condensate undisturbed and the chemical oxygen demand (COD) of the condensate is not completely removed, an aerobic after-treatment is performed wherein the residual carbon source is used in the nitrification and subsequent denitrification, whereby nitrogen containing compounds, mainly ammonia, are eventually converted into nitrogen. With respect to the aerobic after-treatment the method according to the invention is therefore characterized in that the effluent originating from the anaerobic treatment is denitrified in a denitrification unit and nitrified in a nitrification unit, and wherein a portion of the sludge-influent mixture from the nitrification unit is recirculated to the denitrification unit. Because the sludge-influent mixture from the nitrification unit is fed back to the denitrification unit, nitrification and denitrification can take place simultaneously in the same installation, while optimal use can nevertheless be made in the denitrification of the carbon source (COD) still present in the influent. The recirculation ratio, that is, the recirculated flow over the flow to the nitrification unit, amounts generally to 10-30, more preferably 15-25, such as 20. The recirculation ratio is dependent on the composition of the effluent, particularly the concentrations of ammonia and other nitrogen compounds present, but specifically on the carbon source present.

If this carbon source is not present in the influent in sufficient quantity, it has been found, surprisingly, that crude condensate can be used for supplementing the carbon source without the denitrification and nitrification being adversely influenced thereby.

Depending on the composition of the influent and the crude condensate the influent may contain 1-20% crude condensate, more preferably 5-20% and such as in practice 10-15%.

Sludge deriving from the nitrification unit is preferably pre-mixed with the influent. The micro-organisms present in the sludge are thus exposed to high substrate concentrations, whereby the floc formation is promoted. This floc forming, the growing of micro-organisms to agglomerates, is very important for the later separating of the formed biomass (sludge) from the treated liquid in the settling tank.

If the anaerobic treatment and the aerobic treatment according to the invention are performed optimally, the condensate can be treated to a dischargeable liquid, and the treating method according to the invention achieves a treatment yield that is greater than 90% BOD (biological oxygen demand), but the treatment yield is frequently greater than 95% BOD, and in practice the treatment yield amounts to 97-99% BOD.

The method according to the invention will be described hereinafter with reference to an embodiment in a treating installation which is depicted schematically in flow diagrams in FIGS. 1 (anaerobic treatment) and 2 (aerobic treatment).

Pig manure with the composition indicated in table 1 is acidified with nitric acid to circa pH 4.

Depending on the degree of acidification the ammonia content of the condensate amounts generally to between 500 and 2000 ppm.

The acidified manure is mixed with a water-insoluble liquid paraffin with a boiling point of about 180° C. The mixture of manure and paraffin is concentrated in a concentrator, wherein the vapour formed is condensed in a condenser. Resulting from this heat treatment of a duration of at least 30 minutes is a condensate that can be considered as a sterilized liquid.

Added to the condensate prior to treating in the installation in FIG. 1 are a macro/micro-nutrient solution and a trace element solution. The macro/micro-nutrient solution has the following composition: $KH_2PO_4$ 28.3 g/l, $(NH_4)_2SO_4$ 28.3 g/l, $CaCl_2.2H_2O$ 24.5 g/l, $MgCl_2.6H_2O$ 25 g/l, KCL 45 g/l, yeast extract 3.3 g/l, in demineralized water; the trace element solution had the following composition: $FeCl_2.4H_2O$ 2000 mg/l, $H_3BO_3$ 50 mg/l, $ZnCl_2$ 50 mg/l, $CuCl_2.2H_2O$ 30 mg/l, $MnCl_2.4H_2O$ 500 mg/l, $(NH_4)_6MO_7O_{24}.4H_2O$ 50 mg/l, $AlCl_3.6H_2O$ 90 mg/l, $CoCl_2.6H_2O$ 2000 mg/l, $NiCL_2.6H_2O$ 92 mg/l, $Na_2SeO.5H_2O$ 164 mg/l, EDTA 1000 mg/l, resazurine 200 mg/l, HCL 36% 1 ml/l, in demineralized water. The composition of the condensate that is fed to the installation of FIG. 1 is also stated in table 1.

The condensate is fed to the anaerobic treatment installation that is shown in FIG. 1.

The condensate is fed via a conduit 1 having a pump 2 accommodated therein to a feed conduit 3 of the reactor 4. The reactor 4 is of the so-called upflow anaerobic sludge-bed type (UASB). The biomass present in the reactor 4 is formed from an oculate with granular sludge derived from a central treating installation of waste water from the paper industry.

Via a riser pipe 6 that is closable with a valve 5 effluent leaves the reactor 4 via a conduit 7. A portion of this effluent is recirculated via the recirculation conduit 8 wherein a pump 9 is arranged. The recirculation factor amounted to 10. Thus obtained was a superficial liquid speed of 0.15-0.6 m per hour.

The anaerobic treatment was performed at a temperature of 35° C. while formed biogas was discharged via a conduit 10 for further processing and later generating of calorific heat.

In the installation shown in FIG. 1 the hydraulic duration time was 24 hours. The specific sludge load amounted to 0.14 kg COD/kg VSS. day, at a volume load of 7.3 kg $COD/M^3$. day. 5 kg of sodium hydrogen carbonate per $m^3$ was moreover added to the condensate.

After stabilization a COD removal yield of 90-95% was obtained (after separation of suspended material from the effluent).

It can be seen from these experimental conditions that the composition of the supplemented condensate is sufficient to meet the nutrient requirements for nitrogen, phosphor, sulphur, potassium, calcium, magnesium and iron.

Figure 2:
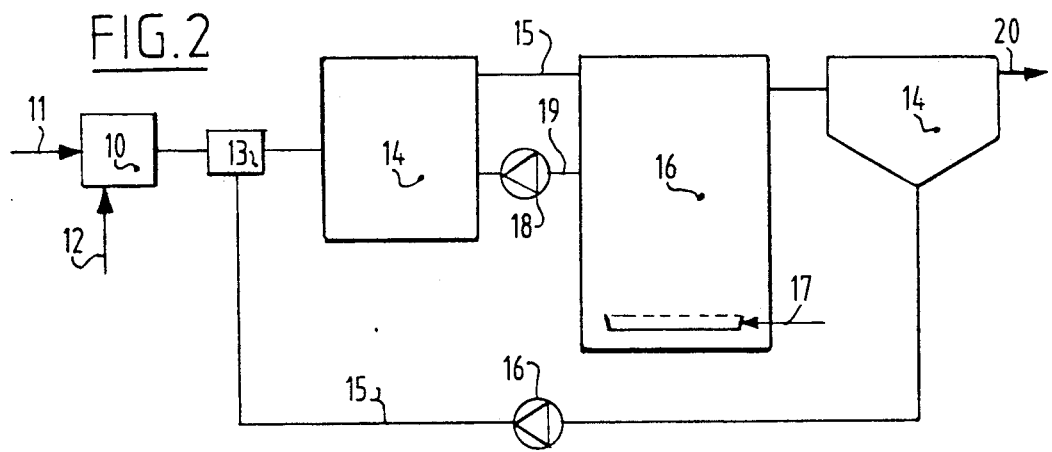

With reference to FIG. 2, the influent derived from the anaerobic treatment shown in FIG. 1 is added to a mixing tank 10 to which crude condensate is also added via the conduit 10 in a quantity such that the influent eventually contains 10% crude condensate. The compositions of the crude condensate, the anaerobically treated condensate and the anaerobically treated condensate +10% crude condensate (influent) are shown in table 2.

The influent is fed to a contact tank 13 wherein the influent is mixed with sludge coming from the settling tank 14 and is recirculated via a conduit 15 in which is arranged a pump 16. The influent-sludge mixture is fed to a denitrification unit 14 in which nitrogen oxides ($NO_2-$ and $NO_3-$) are converted into nitrogen gas. The carbon source required during denitrification is formed by constituents from both the anaerobically treated condensate and the crude condensate mixed therewith.

Via a conduit 15 the liquid-sludge mixture comes into a nitrification unit 16 wherein the sludge-liquid mixture is aerated with air blown in via the line 17. The oxygen present in the air is used by the micro-organisms to convert ammonia into $NO_2-$ and $NO_3-$. 95% of the content of the nitrification unit is fed back via a conduit 19 provided with a pump 18 to the denitrification unit 14. Only 5% of the content of the nitrification unit is discharged to the settling tank 14 in which sludge and treated liquid are separated. The treated effluent leaves the settling tank 14 via the conduit 20. The composition of the effluent is shown in table 2.

In the denitrification unit 14 the $NO_3-$ concentration lay between 10 and 20 mg/l during the test. At the beginning of the test the $NO_3$ concentration even amounted for some time to 10 mg/l. The pH varied between 8.1 and 8.5.

In the nitrification unit the pH lay between 7.9 and 8.7. The oxygen content varied between 0.5 and 5.0 mg/l and had an average of 2.6 mg/l.

The sludge quality was satisfactory. The sludge content in the system amounted over the whole test to an average 4.0 gSS/l. The ash percentage of the solids was an average 23%, while the chemical oxygen demand of the sludge amounted to 1.2 gCOD/gSS. The sludge accretion amounted to an average of 0.14 gSS/S added COD, or 0.15 gCOD/g added COD.

Over the whole test the treating yield amounted to 99.8 BOD%.

TABLE 1

|  | manure | condensate | condensate + nutrient solution |
|---|---|---|---|
| COD (mg/l) | 150.000 | 7,300 | 7,300 |
| $NH_4-N$ (mg/l) | 6,000 | 300 | 620 |
| P-total | 2,100 | 37 | 76 |
| Cl (mg/l) | 3,400 | 60 | — |
| K (mg/l) | 6,900 | — | — |
| Acetic acid (mg COD/l) | 17,600 | 4,500 | 4,500 |
| Propionic acid (mg COD/l) | 7,600 | 1,800 | 1,800 |
| Isobutyric acid (mg COD/l) | 1,600 | 400 | 450 |
| Butyric acid (mg COD/l) | 6,600 | 1,200 | 1,200 |
| Isovaleric acid mg COD/l) | 600 | 770 | 770 |
| Valeric acid (mg COD/l) | — | 140 | 140 |

TABLE 2

|  | crude condensate | anaerobically treated condensate | anaerobically treated + 10% crude | effluent |
|---|---|---|---|---|
| BOD (mg/l) | 18,500 | 120 | 2.000 | <15 |
| COD (mg/l) | 25,900 | 430 | 3,000 | <100 |
| $NH_4-N$ (mg/l) | 790 | 320 | 370 | <1 |
| P (mg/l) | — | 38 | 34 | ≦25 |
| K (mg/l) | — | 160 | — | — |
| pH | 4.0 | 7.9 | — | — |
| $NO_2-$ (mg/l) | — | — | — | <20 |
| $NO_3-$ (mg/l) | — | — | — | <25 |

I claim:

1. Method for processing manure, comprising the steps of:
   i) adding an organic carrier liquid to the manure;
   ii) concentrating the mixture of manure and carrier liquid;
   iii) forming a vapour and condensing said formed vapour into a crude condensate;
   iv) anaerobic treating of said crude condensate; and
   v) aerobic treating of the effluent from the anaerobic treatment.

2. Method as claimed in claim 1, wherein prior to concentrating the manure is acidified.

3. Method as claimed in claim 1, wherein a portion of the effluent from the anaerobic treatment is recirculated and mixed with said crude condensate for treating.

4. Method as claimed in claim 3, wherein 20-90% of said effluent is recirculated.

5. Method as claimed in claim 3, wherein 30-80% of said effluent is recirculated.

6. Method as claimed in claim 3, wherein 40-80% of said effluent is recirculated.

7. Method as claimed in claim 1, wherein a nutrient preparation is added to said crude condensate.

8. Method as claimed in claim 7, wherein the nutrient preparation supplements for a nitrogen requirement of at least 50 g/m$^3$.

9. Method as claimed in claim 7, wherein the nutrient preparation supplements for a phosphor requirement of at least 10 g/m$^3$.

10. Method as claimed in claim 7, wherein said nutrient preparation contains trace elements.

11. Method as claimed in claim 7, wherein the nutrient preparation supplements for a nitrogen requirement of at least 60 g/m$^3$.

12. Method as claimed in claim 7, wherein the nutrient preparation supplements for a nitrogen requirement of at least 70 g/m$^3$.

13. Method as claimed in claim 7, wherein the nutrient preparation supplements for a phosphor requirement of at least 15 g/m$^3$.

14. Method as claimed in claim 7, wherein the nutrient preparation supplements for a phosphor requirement of at least 20 g/m$^3$.

15. Method as claimed in claim 1, wherein the anaerobic treatment achieves a Chemical Oxygen Demand processing yield of more than 80%.

16. Method as claimed in claim 1, wherein, in the anaerobic treatment, a waste water sludge is used which has been derived from the treatment of waste water from alcohol preparation and/or paper preparation.

17. Method as claimed in claim 16, wherein said waste water sludge is adapted to the degradation of $c_n$ fatty acids, wherein n≧2.

18. Method as claimed in claim 1, wherein the effluent deriving from the anaerobic treatment is denitrified in a denitrification unit and nitrified in a nitrification unit, and wherein a portion of a sludge-influent mixture, comprising a mixture of sludge from the nitrification unit and influent to the nitrification unit, from the nitrification unit is recirculated to the denitrification unit.

19. Method as claimed in claim 18, wherein the recirculation ratio for said sludge-influent mixture amounts to 10-30.

20. Method as claimed in claim 18, wherein a quantity of said crude condensate is added to the influent to the nitrification unit.

21. Method as claimed in claim 20, wherein said influent contains 1-20% crude condensate.

22. Method as claimed in claim 20, wherein said influent contains 5-20% crude condensate.

23. Method as claimed in claim 20, wherein said influent contains 10-15% crude condensate.

24. Method as claimed in claim 18, wherein a quantity of said sludge from the nitrification unit is pre-mixed with a quantity of said influent to the nitrification unit.

25. Method as claimed in claim 18, wherein said method yields greater than 90% Biological Oxygen Demand.

26. Method as claimed in claim 18, wherein the recirculation ratio for said sludge-influent mixture amounts to 15-25.

27. Method as claimed in claim 18, wherein the recirculation ratio for said sludge-influent mixture amounts to 20.

28. Method as claimed in claim 18, wherein said method yields greater than 95% Biological Oxygen Demand.

29. Method as claimed in claim 18, wherein said method yields greater than 97% Biological Oxygen Demand.

30. Method as claimed in claim 1, wherein the anaerobic treatment achieves a Chemical Oxygen Demand processing yield of more than 85%.

31. Method as claimed in claim 1, wherein the anaerobic treatment achieves a Chemical Oxygen Demand processing yield of more than 90%.

* * * * *